3,490,285
CONVEX PULLEY
Georg Schaeffler and Walter Donath, Herzogenaurach, Germany, assignors to Industriewerk Schaeffler, OHG, Herzogenaurach, Germany, a corporation of Germany
Filed Aug. 19, 1968, Ser. No. 753,382
Claims priority, application Germany, Sept. 9, 1967, J 16,914; May 15, 1968, J 17,946
Int. Cl. F16h 55/36, 55/44
U.S. Cl. 74—230.5                            4 Claims

ABSTRACT OF THE DISCLOSURE

A belt tension roller having a convex outer surface comprising a pair of arcuate half shells adapted to be mounted on the outer race of a bearing assembly.

BACKGROUND OF THE INVENTION

Recently, convex outer circumferential faces have been used on pulleys for use as belt tension rollers with considerable success in preventing the slippage of the belt relative to the surface. The flexible belt, when placed under longitudinal tension, defines a concave mating face with the convex surface of the roller and transverse slippage or "creeping" of the belt is substantially eliminated.

Known rollers with convex outer circumferential faces are made of plastic material. The plastic material, however, creates electrostatic build-ups which cause disturbances in the spinning process when these rollers are used in four spindle drives for spinning machines. Known pulleys made of sheet metal only have a very slight convexity of their outer faces, because producing of convex outer faces is very difficult. Pulleys having only a slight convexity in the outer face cannot lead the belt exactly.

SUMMARY OF THE INVENTION

The present invention overcomes the shortcomings heretofore experienced in the prior art of manufacturing pulleys or rollers having a convex outer circumferential face over which a flexible belt runs. More particularly, the present invention relates to a simple, easily assembled pulley or roller construction which is inexpensively manufactured and because of its design may be produced in high volumes with substantially no machining.

BRIEF DESCRIPTION OF THE DRAWINGS

The various features of the apparatus of the present invention will become apparent from the accompanying drawings and the following detailed description, which relate to a preferred embodiment of the invention and are given by way of illustration.

DETAILED DESCRIPTION OF THE INVENTION

Figure 1:
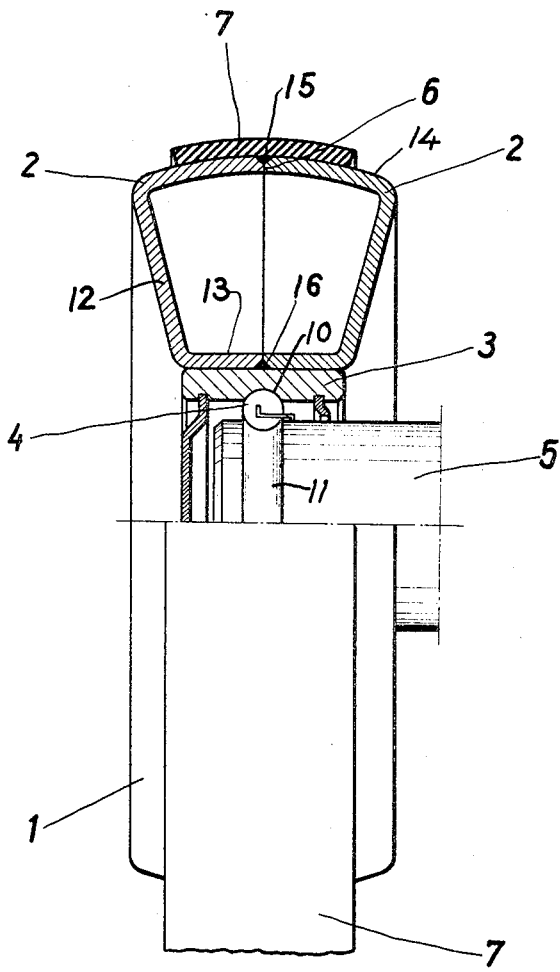
FIG. 1 is a detailed view partially taken in cross-section to illustrate the present invention.

Referring now to the embodiment illustrated in FIG. 1, a pulley 1 is adapted to be secured to the outer race 3 of a ball bearing assembly. The assembly comprises a plurality of balls 4 disposed and retained in aligned raceways 10 and 11 provided in outer race member 3 and shaft 5, respectively. By this arrangement, the outer race member 3 is free to rotate relative to the shaft.

The pulley is made up of two mating half shells 2 of drawn or stamped sheet metal, which include a circular plate 12 having projecting flanges 13 and 14. When two half shells are aligned so that the flanges of each abut, the two mating outer flanges 14 define a convex circumferential outer face while the abutting inner flanges 13 define a circular aperture whose axis is concentric with the arcuate crown formed by the convex surface. The plate 12 defines a slight angle with the axis of the aperture formed by flanges 13 which provides greater support to the pulley outer face to withstand the stresses imparted by the belt. The abutting edges 14 of the two bowl-shaped halves 2 which come together in the middle of the belt race are bent in such a way that they exhibit a tangent to the axis of the roller at the abutting seam. If these two halves are press fitted against the outer race member 3 of the roller bearing, a welded connection of the two bowl-shaped halves 2 is, as a rule, not necessary in this embodiment of the invention to form a satisfactory belt tension roller.

However, the two halves 2 may be welded together by forming bevelled edges 15 and 16 at the meeting edges on the outer flange 14 and the inner flange 13, respectively, to receive a conventional welding or joining media for connecting the two half shells. A force fit may be effected between the aperture defined by the inner flanges 13 and the outer surface of the outer race member 3 to retain the pulley on the rotatable bearing assembly. Alternatively, other suitable securing means, such as welding or adhesives, may be utilized to retain the pulley on the assembly. When flexible belt 7 is entrained over the outer surface of the bearing, it defines a concave mating surface which rides on the crest or crown of the convex surface of the pulley and reduces the occurrence of sidewise creeping.

Figure 2:
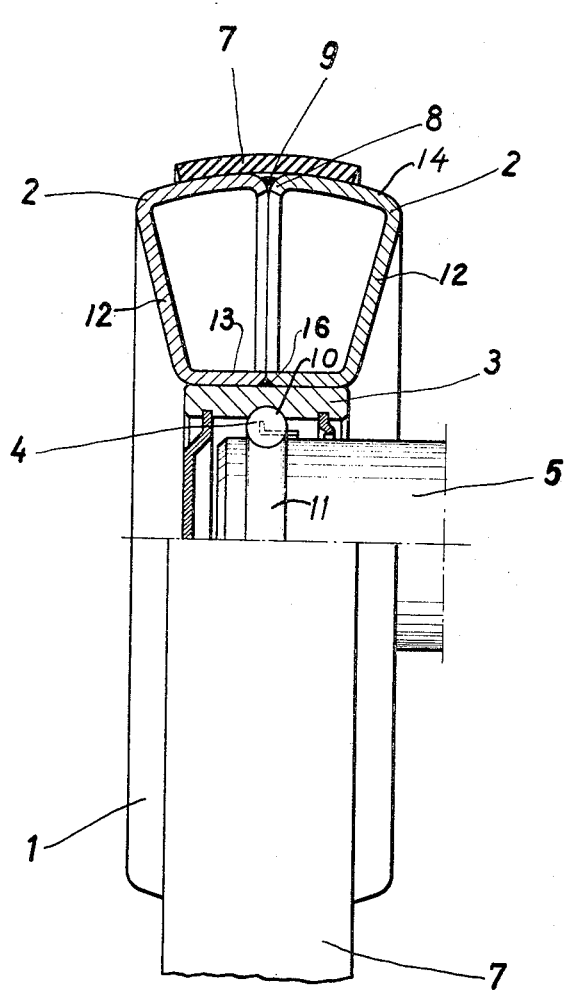
FIG. 2 is similar to FIG. 1 and illustrates an alternate embodiment of the present invention.

The embodiment of FIG. 2 differs from the pulley of FIG. 1 in the design of the outer flange 14. In this embodiment, flanged edges 8 project inwardly and downwardly to form a wider area for a welding seam 9 joining the half shells. The flanged edges 8 may also be drawn inwardly to such an extent that the radial surfaces formed thereby may be secured together by suitable adhesives.

Although two examples have been illustrated and described, it will be evident to those skilled in the art that various modifications may be incorporated into the details of production without departing from the preferred detailed construction herein described.

We claim:

1. A roller body of drawn sheet metal for use as a belt tension roller and having a convex outer diameter forming a belt race, characterized in that the roller body consists of two bowl-shaped halves whose edges abut in the middle of the belt race, said edges being drawn inwardly.

2. A roller body of drawn sheet metal for use as a belt tension roller and having a convex outer diameter forming a belt race, said roller body consisting of two bowl-shaped halves whose edges abut in the middle of the belt race, each of the bowl-shaped halves comprises a circular plate having a pair of arcuate flanges disposed at the circular edges of said plate whereby the abutment of the flanges of the halves form a convex outer face and a circular aperture.

3. A roller body according to claim 2, wherein the outer flange of one half defines an edge which abuts with the edge of the outer flange of the other half at the midpoint of the convex circumferential face.

4. A roller body according to claim 2, wherein said outer flange of each of the bowl-shaped halves terminates in an inwardly flanged portion, said inwardly flanged portions being joined at the midpoint of the convex circumferential face.

References Cited

UNITED STATES PATENTS

| | | | |
|---|---|---|---|
| 140,310 | 6/1873 | Sheldon | 74—230.8 XR |
| 907,475 | 12/1908 | Domman | 74—230.8 XR |
| 1,085,090 | 1/1914 | Lachman | 74—230.8 XR |
| 2,655,813 | 10/1953 | Howell | 74—230.5 |
| 2,709,371 | 5/1955 | Hale | 74—230.5 |

FOREIGN PATENTS 141,829  4/1920  Great Britain.

JAMES A. WONG, Primary Examiner

U.S. Cl. X.R.

74—230.8